Dec. 14, 1926.
E. L. KNAPP
AXLE GAUGE
Filed July 13, 1926
1,610,688
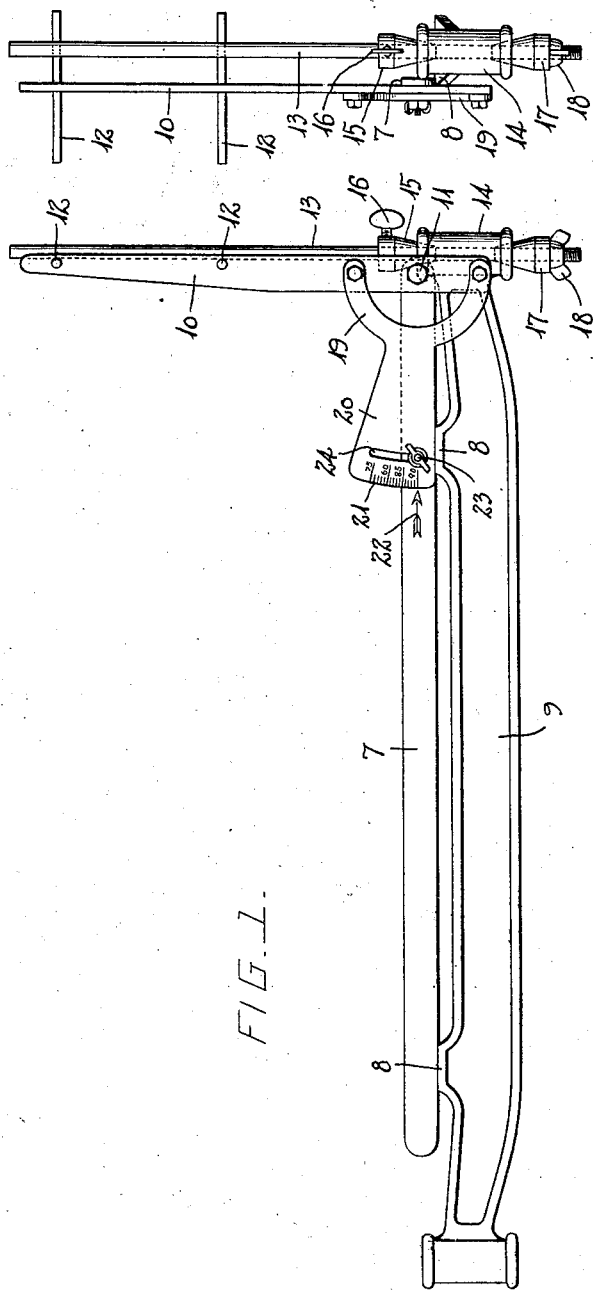
Inventor:
Edwin L. Knapp
By Monroe E. Miller
Attorney.

Patented Dec. 14, 1926.

1,610,688

UNITED STATES PATENT OFFICE.

EDWIN L. KNAPP, OF ANACORTES, WASHINGTON.

AXLE GAUGE.

Application filed July 13, 1926. Serial No. 122,206.

The present invention relates to axle gauges, and aims to provide a novel and improved device for determining the angles of the king pin axes relatively to the axle, in order to facilitate the bending back of the axle after being bent or distorted out of proper shape.

It is also an object of the invention to provide an axle gauge which is simple in construction and convenient in use, and which may be applied to the axle while the axle is held in a press or bending device.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation of the axle gauge as applied to an axle.

Fig. 2 is an end view thereof.

The gauge comprises a bar 7 adapted to bear on the spring saddles or seats 8 of the front axle 9 of an automobile or motor vehicle, and an arm or bar 10 pivoted, as at 11, to one terminal of the bar 7 to be disposed parallel with the axis of the king pin for which the angle is being determined. Two pins 12 extend through and are secured to the arm 10 at different distances from the pivot 11, and are adapted to contact with a king pin rod 13 used in place of the king pin. The rod 13 extends through the end bearing 14 of the axle, and a tapered collar 15 is secured on the rod 13 by means of a set screw 16 to enter the upper end of the bearing 14, while a lower tapered collar 17 is slidable on said rod to enter the lower end of the bearing, a nut 18 being screw-threaded on the lower terminal of the rod to force the collar 17 upwardly, thereby securing the rod 13 firmly in place with its axis coinciding with the axis of the bearing 14 and king pin.

A yoke 19 is secured at its ends to the arm 10 astride the pivot 11, and has a wing 20 projecting therefrom and provided with graduations 21 cooperating with a pointer or index 22 on the bar 7, to indicate the angle of the arm 10 and king pin axis relatively to the axle 9. The wing 20 and yoke 19 are preferably formed from a plate of metal, and said wing has an arcuate slot 24 receiving a clamping bolt 23 carried by the bar 7, so that the wing 20 and bar 7 may be clamped together, for maintaining the arm 10 at the corresponding angle with the bar 7.

As seen in Fig. 2, the bar 7 and arm 10 may be located to one side of the median plane or center line of the axle, inasmuch as the pins 12 project to opposite sides from the arm 10 to contact with the rod 13, and the gauge may be used at either side of the axle, and at either end thereof. This enables the gauge to be applied to the axle while the axle is held in a bending press or device, inasmuch as the spring saddles or seats 8 usually project sufficiently to receive the bar 7 thereon even when the axle is held in a press or other device used for bending the axle back into proper shape.

Having thus described the invention, what is claimed as new is:—

1. An axle gauge comprising a bar to bear against a vehicle axle substantially parallel therewith, an arm pivoted to said bar to be disposed substantially parallel with the axis of an end bearing of the axle in front or in rear of said bearing, means between said bar and arm for indicating the angle between them, and pins carried by said arm and projecting to one side therefrom to contact, beyond one end of the bearing, with a king pin rod extending through said bearing.

2. An axle gauge comprising a bar adapted to bear against an axle, an arm pivoted to said bar, means between said bar and arm for indicating the angle between them, and pins extending through and secured to said arm and projecting to opposite sides thereof to contact with a king pin rod.

3. An axle gauge comprising a bar adapted to contact with a vehicle axle substantially parallel therewith, an arm pivoted to said bar to be disposed substantially parallel with the axis of an end bearing of the axle, means between said bar and arm for indicating the angle between them, and portions carried by said arm and projecting to one side therefrom to contact, beyond one end of said bearing, with a king pin rod extending through said bearing, with said bar and arm disposed at one side of the median plane of said axle.

In testimony whereof I hereunto affix my signature.

EDWIN L. KNAPP.